Sept. 23, 1969     B. J. COSTELLO     3,469,061
SOLDERING APPARATUS
Filed June 28, 1966     2 Sheets-Sheet 1
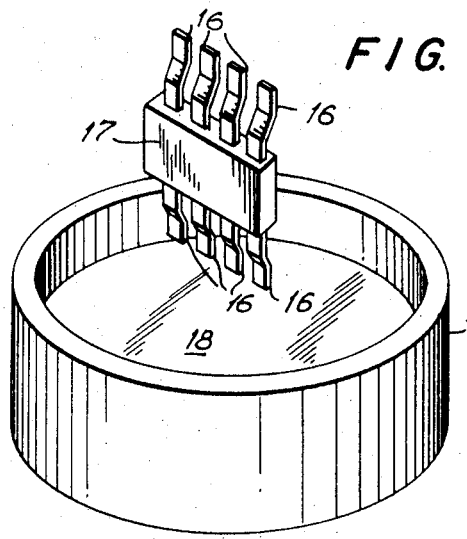
FIG. 1
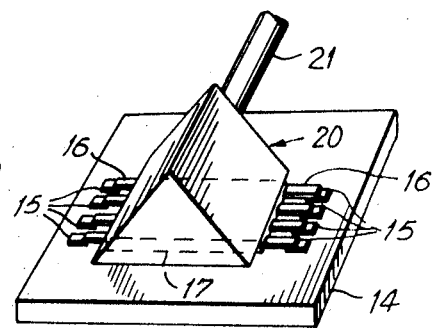
FIG. 4
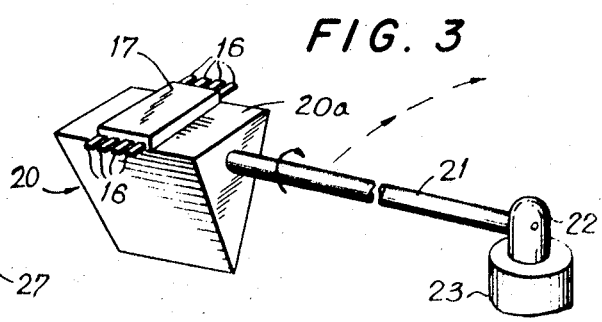
FIG. 3
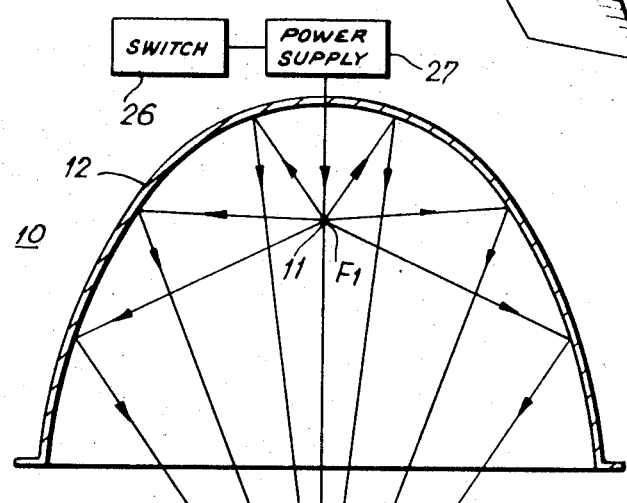
FIG. 2
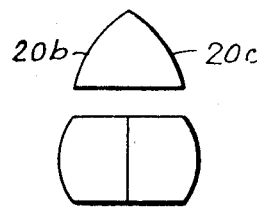
FIG. 2a
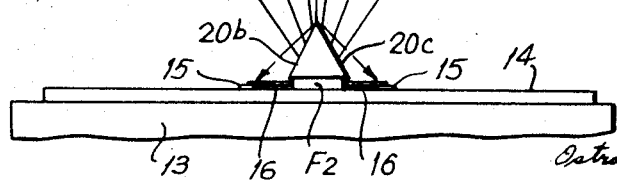
INVENTOR.
BERNARD J. COSTELLO
BY
Ostrolenk, Faber, Gerb & Soffen
ATTORNEYS

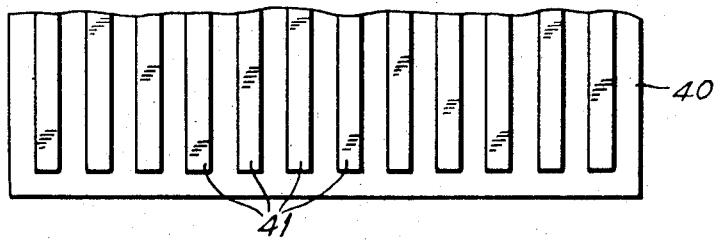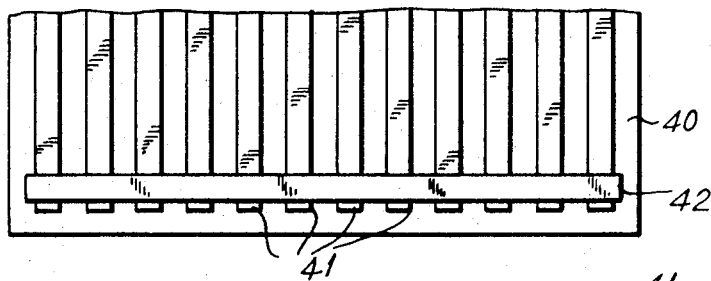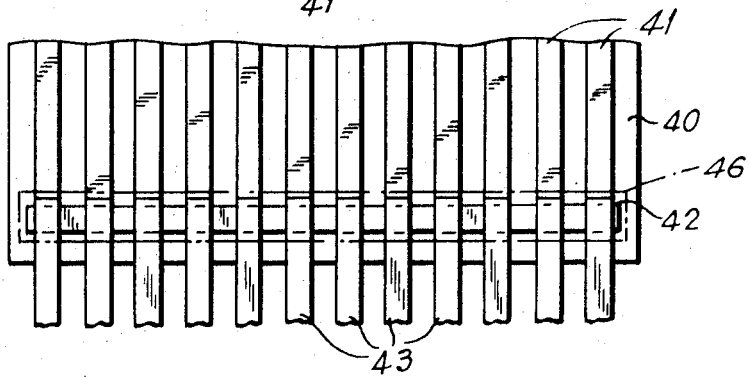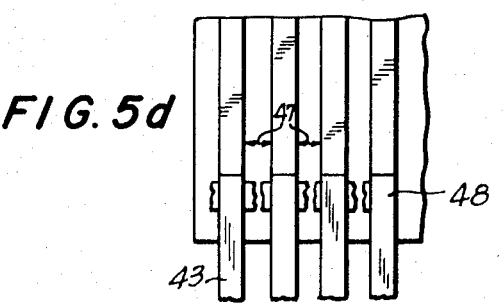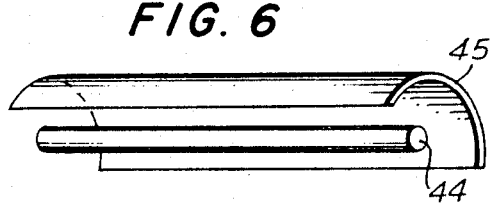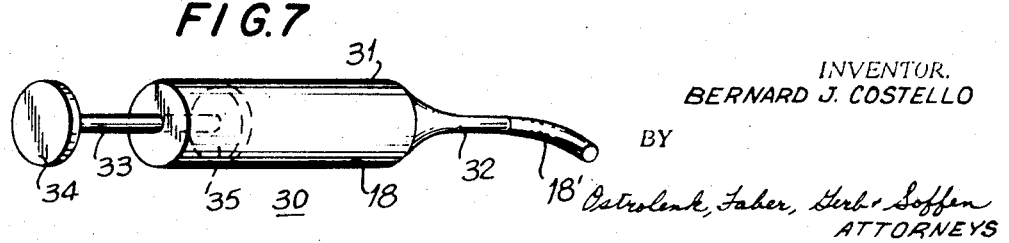

United States Patent Office 3,469,061
Patented Sept. 23, 1969

3,469,061
SOLDERING APPARATUS
Bernard J. Costello, Ringoes, N.J., assignor to Argus Engineering Company, Hopewell, N.J.
Filed June 28, 1966, Ser. No. 561,112
Int. Cl. B23k 1/04
U.S. Cl. 219—85
12 Claims

ABSTRACT OF THE DISCLOSURE

A radiant energy apparatus and method for soldering engaging conductive surfaces of two members or for preheating a preselected region of a single member including a radiant energy source, reflective means for focusing radiation from the source upon the region to be heated and second reflective means positioned in close proximity to the member (or members) to be heated for redirecting and thereby concentrating radiation upon the preselected region (or regions) of the member (or members) to be heated which further acts to prevent radiation from striking other predetermined regions of the member (or members) and thereby prevent undue heating of such predetermined regions.

---

This invention relates to soldering, and more particularly to a method and apparatus for soldering electronic circuitry through the use of infrared heating of the terminals to be connected together in combination with a solder cream to provide a superior solder joint while completely avoiding thermal shock, or other damage to the connecting terminals.

Printed circuit board soldering is most commonly done by automatic wave soldering or iron soldering by hand. Either method is satisfactory for routine work. However, in applications where thermal sensitivity is critical, or where the possibility of contamination must be minimized, infrared soldering has definite advantages.

Infrared heating techniques as applied to manufacturing operations are being investigated by many groups. The term "infrared" is employed herein to describe broad band radiation from a hot body, even though the radiation band utilized typically extends well into the visible range.

Infrared heating is a non-contact method of heat transfer; no physical elements such as a soldering iron makes physical contact with the work piece, and no forces are present during the heating operation. Two very important advantages arise from this:

(1) There is absolutely no chance of contamination of the workpiece by the heater; and
(2) When considering printed circuit soldering, the peaking or tip-off problem is totally eliminated. A further by-product of the elimination of peaks is the ability to solder at lower temperatures than are possible with other conventional soldering methods.

Infrared heating is properly termed "radiative heat transfer." Transfer is accomplished by electromagnetic waves. An immediate consequence of this is that heating is accomplished without physically touching the work. Also, the work may be performed without any danger of contamination from the heater, and heating may take place in any controlled atmosphere including a vacuum condition.

All common soldering methods (except the R.F. method which is another form of electromagnetic wave heating) requires some physical contact between the workpiece and the heater. The soldering iron requires intimate contact for efficient conduction; hot gas techniques require a high velocity stream of gas in order to compensate for its relatively low heat content and to heat rapidly enough to avoid burning adjacent components.

Commercial soldering iron for electronic work ordinarily operate in the 600° F. to 700° F. range. This high temperature is necessary to allow fast operation without excessive cooling in the tip of the iron and also to prevent the condition known as "peaking." This phenomenon occurs when the soldering iron is removed from the molten puddle of solder formed during the heating operation. The column of solder that is drawn between the iron and melt "necks down" as the soldering iron is moved away from the workpiece. If the melt is hot enough, the column falls back onto the workpiece after separation, and smooths over due to surface tension. If the melt is not hot enough, it solidifies rapidly and forms a small peak on the solder joint. The trouble with peaking is that it may cause a shorting condition on the printed circuit board, or may bridge between printed circuit boards when they are closely packed. It also conceals the wire being joined, preventing visual inspection.

Other effects of the high soldering iron temperature are thermal shock in the joint area and danger of damage to sensitive components. When the iron is brought against the workpiece, the copper laminate heats very rapidly, causing severe sheer stresses in the adhesive which joins the laminate to the insulating substrate. The sheer stresses may be great enough to cause partial separation from the laminate.

Infrared heating tends to minimize the necessary soldering temperature and the attendant thermal shock because of its mechanism of energy transfer. The emission rate of infrared is essentially constant for a given source of temperature. It is not affected by the speed of operation, or the operator's technique. Also, since it does not touch the workpiece, it will produce a solder joint at the lowest possible temperature without the peaking problem. Exhaustive tests have shown that a solder joint may be made with infrared heating at temperatures 150° F. cooler than with a soldering iron.

Conventional infrared soldering techniques employ an infrared heating apparatus comprising an infrared energy source which may be either a heater filament, an arc discharge device, or a plasma, depending only upon the particular needs of the user. The radiation generated by the heating source is concentrated upon a small area by a focusing system comprising a reflector designed to image the radiation source, located at a first focal point, and a second focal point which is located on or in very close proximity to the region of the workpiece which is to be soldered. When the workpiece, which may, for example, be a printed circuit board, is appropriately positioned, with the solder material in close proximity to the joint to be soldered, the infrared source is energized, melting the solder.

One major problem has been found to be prevalent in infrared radiation techniques. This is the tendency of the printed circuit board to char or burn if the hot spot of infrared radiation impinges upon the insulating substrate. The major reason for this is the high absorptivity of the substrate as compared with the materials forming the joint such as copper or tin. Even though the incident energy is the same upon the workpiece irrespective of the material, the insulating substrate will absorb a higher fraction of the available energy, and heat to the char point much faster than the metallic layer will reach the solder point. In order to correct for this disadvantage, one approach has been the provision of a mechanical mask to prevent excessive heating of the board.

The absorptivity $\alpha$ of a material is defined as the ratio of the amount of energy A absorbed by the body divided by the total incident energy I impinging upon the body. Typical printed circuit board materials have an absorptivity $\alpha$ of the order of 0.6. The $\alpha$ of a solid solder is of the order of 0.08. A comparison of these α's shows that approximately eight times as much of the incident energy is absorbed by the printed circuit board insulating substrate causing the board to char well before the solder absorbs a sufficient amount of energy to melt and form a good joint.

The instant invention is characterized by providing a soldering method and apparatus which incorporates all of the advantages of infrared radiation techniques, while at the same time providing means for completely avoiding charring of the printed circuit board during the soldering operation.

In general, the emissivity of a soldering material which is equal to its absorptivity, is a function of wavelength, temperature, alloy composition and surface condition. As was previously mentioned, a typical emissivity value for clean lead-tin solder is approximately 0.08 which is a relatively low value. Such a low emissivity requires a high radiant flux density of the infrared radiating device which, in turn, causes a severe charring of the printed circuit board, if the radiation impinges on the board.

One of the most critical operating parameters in infrared soldering is the surface condition of the solder. I have found that by using a finely pulverized solder that is suspended in a suitable vehicle the resulting soldering paste or cream has the extremely advantageous characteristic of providing a uniform absorptivity $\alpha$ of the order of .8 which is substantially equal to or greater than the absorptivity of the printed circuit board insulating substrate. The reason for this is that the finely divided powder provides a substantially infinite number of absorbing pockets between the grains causing the infrared radiation impinging upon the solder cream to be efficiently absorbed, thereby resulting in a very rapid heating of the cream.

Another distinct advantage of such a solder cream is its ease of handling. The leads to be soldered may be dipped in the solder cream with the material that adheres to the leads providing sufficient alloy and flux to achieve a good bond to the conductor strips on the printed circuit board to which the leads are to be soldered. The solder cream may also be applied in a very simple manner through the use of a device somewhat resembling a hypodermic assembly wherein the solder cream is squeezed out of the assembly and upon the surface to be soldered. The amount required can be readily and simply controlled.

Still another method of application consists of painting or rolling the solder cream upon the surface of the printed circuit board and then properly positioning the leads to be soldered on the board terminals. Although the solder cream in this application is applied across neighboring terminals of the printed circuit board substrate, ostensibly creating shunt paths, the solder cream "wicks" beneath the leads being soldered to the printed circuit board when exposed to infrared radiation, thereby automatically severing any electrical path between adjacent terminals on the printed circuit board which are normally electrically insulated from one another. The advantage of laying a stripe of solder cream in this manner allows the solder cream not covered by the leads to be soldered to the printed circuit board terminals to receive the total incident energy from the radiation source, enabling the cream to heat up rapidly and "wick" beneath the leads being soldered to the printed circuit board terminals. If the particles of cream do not "wick" under the leads they can be easily removed since solder will not stick to the non-metallic substrate.

Due to the high absorptivity of the solder cream, the infrared radiation source need be energized only so long as required to cause the solder to wet upon the terminals in order to form a good solder joint. With the use of the solder cream, excellent wetting has been found to result well before any charring of the printed circuit board will occur. These techniques, therefore, have been found to provide excellent solder joints further having the advantages of ease of handling of the solder cream, a greatly simplified soldering operation, and elimination of any damage to the printed circuit board due to thermal shock.

As a particularly advantageous feature of the instant invention, the outstanding leads of an electrical component or device can be dipped in the solder paste or cream and then subjected to the infrared radiation, as suggested above, such that the paste-like material hardens on such leads. The device with the paste covered leads can then be sent to many different users who need only remelt the solder, position the device with respect to a particular circuit in which a joint must be made, and then apply once again the final step of infrared radiation. It will be appreciated that such a feature broadens the application of the instant invention in that a variety of ultimate users may connect the appropriately treated component into each of their individual circuit needs. This is to be contrasted to the first described process wherein properly soldered joints are utilized to complete an entire circuit in the first instance.

Similarly, such steps may be applied to the terminals of a printed circuit board, such that the ultimate user can subsequently solder his own components thereto with a minimum of effort.

It is, therefore, one object of the instant invention to provide a novel method and apparatus for forming an excellent solder joint employing a solder paste having extremely high absorptivity characteristics.

Yet another object of the instant invention is to provide a novel method and apparatus for forming an excellent solder joint employing a solder paste having extremely high absorptivity characteristics wherein the solder paste is formed by dividing solid solder into a fine powder and holding the powder together with a suitable binder.

Another object of the instant invention is to provide a novel method and apparatus for forming excellent solder joints comprising the steps of applying a solder paste having a high coefficient of absorptivity to at least one of the two terminals forming the solder joint and exposing the region of the joint to infrared radiation.

Still another object of the instant invention is to provide a novel method and apparatus for forming an excellent solder joint comprising an infrared radiation source and means for focusing radiation from said source upon the joint to be soldered which contains a solder paste having an extremely high absorptivity coefficient.

Yet another object of the instant invention is to provide a novel method and apparatus for forming an excellent solder joint comprising an infrared radiation source and means for focusing radiation from said source upon the joint to be soldered which contains a solder paste having an extremely high absorptivity coefficient $\alpha$ of the order of 0.8.

Another object of the instant invention is to provide a novel method for forming an excellent solder joint comprising the steps of applying a solder paste having a high coefficient of absorptivity to at least one of the terminals forming said joint, holding the terminals forming said joint in surface engagement and impinging infrared radiation which is concentrated in the immediate region of the joint for a predetermined time period.

Another object of the instant invention is to provide a novel method for forming an excellent solder joint comprising the steps of applying a solder paste having a high coefficient of absorptivity to at least one of the terminals forming said joint, holding the terminals forming said joint in surface engagement and impinging infrared radiation which is concentrated in the immediate region of the joint for a predetermined time period, wherein said predetermined time period is of a duration insufficient to char the insulating substrate of a printed circuit board.

Still another object of the instant invention is to provide a novel method for forming a plurality of solder joints between closely spaced printed circuit terminals and a plurality of leads, each being associated with one of said terminals comprising the steps of: laying down a continuous stripe of a solder paste having a high coefficient of absorptivity across said printed circuit board terminals; positioning the plural leads upon their associated terminals; and exposing all of said joints to an elongated beam of concentrated infrared radiation, causing the solder cream applied to the board between adjacent board terminals to "wick" beneath the leads so as to sever any electrical path between adjacent terminals while forming an excellent solder joint between associated terminals and leads.

Yet another object of the instant invention is to provide an apparatus and method for properly depositing a paste-like solder cream on the leads of a circuit component or other member whereby a plurality of ultimate users may subsequently solder the treated leads of such device or member to the leads of their individual circuits.

These and other objects of the instant invention will become apparent when reading the accompanying description and drawings, in which:

FIGURE 1 is a perspective view showing the manner in which the leads of an integrated circuit may be coated by a solder cream;

FIGURE 2 is an elevational view showing the apparatus employed in forming solder joints between the leads of an integrated circuit and associated terminals of a printed circuit board;

FIGURE 2a is a view of an alternative embodiment of a portion of the apparatus of FIGURE 2;

FIGURE 3 is a perspective view showing the manner in which an integrated circuit is loaded into the apparatus of FIGURE 2 prior to the soldering operation;

FIGURE 4 is a perspective view showing the positioning of the integrated circuit upon the printed circuit board in greater detail;

FIGURES 5a through 5d are top views of a printed circuit board showing the method steps employed in soldering a large number of leads to associated terminals of the printed circuit board;

FIGURE 6 is a perspective view showing an infrared radiation apparatus used in the method depicted in FIGURES 5a through 5d; and FIGURE 7 is a perspective view of one assembly which may be employed for dispensing the solder cream.

FIGURES 2 through 4 show one preferred apparatus 10 which may be employed for soldering the leads of an integrated circuit device to associated terminals of a printed circuit board. Considering FIGURE 2, the soldering apparatus 10 is comprised of an energy source 11 capable of emitting infrared radiation. The energy source 11 may be a filament, an arc discharge device, or a plasma device. However, in the embodiment of FIGURE 1, the energy source is a 1,000 watt filament lamp which is positioned above the work zone such that the image of the lamp filament is located at the focal point $F_1$. An elliptical focusing system comprising an elliptical reflector 12 causes all light generated at the focal point $F_1$ striking the reflector to pass through a second focal point $F_2$ which is in the immediate region of the workpiece. While one particular type of energy source and reflector has been described herein, it should be understood that any other suitable radiating energy source and reflector may be employed, depending only upon the needs of the user. Other suitable structures are described in detail in the following articles:

"Soldering with Infrared Heating," by B. J. Costello, published in the July 1964 edition of the Western Electric Engineer, vol. VIII No. 3, pages 11–16;

"Concentrated Radiant Energy," by B. J. Costello, published in the January 1963 edition of the Western Electric Engineer, vol. VII, No. 1, pages 40–46;

"Infrared Soldering of Printed Circuits," by B. J. Costello, appearing in the January 1965 issue of Electronic Products, pages 26, 27 and 56–58.

Any of the variety of radiation sources and reflectors may be employed with the apparatus described herein with equal success, with the final design choices depending only upon the particular application to which they are to be applied.

The energy source 11 and reflector 12 are positioned above a table or support 13 by any suitable supporting structure (not shown) so that the re-imaging focal point $F_2$ is located slightly above the board 13 for the soldering operation.

In the embodiment shown in FIGURES 2 and 4, the printed circuit board 14 is provided with a plurality of terminals 15 which are to be soldered to the associated leads 16 of an integrated circuit device 17 which is a flat modular electronic circuit package of substantially small size and, due to its general configuration, is typically referred to as a flat pack.

Before positioning the flat pack in the manner shown in FIGURE 2, the leads 16 of the flat pack are dipped into a solder cream 18 contained in a suitable vessel 19 to suitably coat all of the leads. As was previously mentioned, the solder cream is comprised of a finely divided solder powder held together by a suitable binding material. The leads are dipped a predetermined depth into the cream, and the material which adheres to the leads provides sufficient solder alloy and flux to achieve a good bond to the conductor terminals of the printed circuit board 14.

The solder cream 18 may be any suitable solder mixture such as a lead-tin alloy solder which has been pulverized into a finely divided powder, with the powder being held together by any suitable binder. One preferred type of solder paste is that manufactured by the Alpha Metals Company under the name Alpha Solder Cream #990.

After the leads 16 have been dipped into the solder cream a predetermined depth, the body portion of the flat pack is then positioned upon the underside 20a of a triangular-shaped vacuum chuck 20 which is provided with a suitable opening (not shown) which communicates with a vacuum source (not shown) so as to hold the flat pack 17 in place against surface 20a of the vacuum chuck.

The triangular-shaped vacuum chuck is secured to one end of a pivotal arm 21, the lower end of which is pivotally mounted to a pin 22 which, in turn, is secured to any suitable support (not shown) by means of arm 23. After the flat pack 17 has been positioned, the arm 21 is rotated in the direction shown by arrows 24 so as to position the flat pack upon the printed circuit board in the manner shown in FIGURE 4 so that the leads 16 of the flat pack 17 are in proper alignment with and resting upon the associated terminals 15 provided on the printed circuit board 14. The proper positioning of the flat pack relative to the printed circuit board is also shown in the elevational view of FIGURE 2. In order to better locate the body of the flat pack relative to the vacuum chuck, a depression having the general outline of the flat pack body is provided in the underside 20a of the triangular-shaped chuck.

The assembly containing the vacuum chuck and the printed circuit board is then positioned beneath the radiation source. The heating cycle is initiated by actuation of a switch 25 which energizes power supply 27 which powers energy source 11. After a predetermined time interval which is selected to be sufficient to complete the soldering operation, energy source 11 is de-energized automatically by a suitable timer within the power supply. At this time, the operator may remove the fixture from the soldering assembly in readiness for receipt of the next fixture.

The above detailed soldering technique was developed to overcome the disadvantage of available methods. Specifically, the desired method must be rapid, reliable, repeatable and simple in operation. Also, the attached flat pack device must be readily repairable. The above detailed technique is fundamentally a soldering method. All of the advantages of soldering are present, namely, provision of a low resistance joint, repairability and ease of visual inspection. The disadvantages of conventional soldering techniques have all been overcome. These, specifically, are: erratic control of temperature, heavy dependence on operator's skill, and the possibility of damage caused by contact of the joint with the heating device.

The temperature experienced by a typical device in the instant technique is precisely predictable and controllable. This is due to the fact that the total energy delivered to the heated surface is virtually uniform (within the control limits of the power supply, timer, energy source, and so forth). Also since the solder cream technique produces a uniformly high emissivity on the surfaces being heated, the fraction of incident energy absorbed by the surface is uniform from point to point. Therefore, the uniformity of the parts themselves is the only variable, and an exhaustive experimentation shows this to be a very minor factor toward the achievement of a successfully soldered joint.

Variations caused by operator's skill are restricted to one phase of the technique, that of applying the solder cream. The operator must dip the leads into the cream 18 to a prescribed depth. That material which adheres to the leads upon withdrawal is the flux and alloy mixture that serves as the finished joint when heated. The effects caused by the variance in the amount of solder have not been determined. However, test batches of flat packs soldered to epoxy-glass boards do not indicate that any problem exists in this area.

In soldering with radiant energy, the problem of radiation coupling to the work is always present. Thus, a workable quantity of radiant energy absorption must occur in the surface of what is normally a highly reflective material, namely, lead-tin alloy solder. Typical data for reflectivity shows that approximately 94% of the incident energy impinging upon the solder is reflected and only 6% is absorbed. If the board material with a printed circuit board had substantially similar reflectivity characteristics, no problems would be found to exist. However, typical board materials have a maximum reflectivity of only 20% to 30%. Consequently, the substrate heats far more rapidly than the solder coated areas, and quite frequently burns before solder flow is achieved. Application of the solder cream, which, due to its composition, has a reflectivity of 15% to 25% provides a localized area of low reflectivity upon the leads of the flat pack which thereby heat very rapidly and achieve excellent bonding before excessive heating can occur in either the flat pack or the printed circuit board material.

Flat packs of the type designated by the numeral 17 shown in the figures are typically rectangular in shape and are provided with five to seven leads protruding from each of the two longitudinal sides of the rectangular-shaped body. In order to perform a single soldering operation, therefore, two zones must be heated and soldered, i.e., one on each side of the flat pack body. The major problem arising from this operation is that the central portion of the flat pack, i.e., the flat pack body, must be protected from excessive temperature rise while the adjacent zones are being rapidly heated.

One attempt to a solution of this problem was that of placing a suitable mask over the flat pack body to prevent radiation from striking the sensitive area. However, if this approach is employed, the radiation striking the mask is lost as a form of effective work because it is reflected in a Mandom manner. Secondly, the central portion of the focal zone is the region of greatest radiant intensity and is capable of performing work most effectively. If the fringe of the focal zone is depended upon to perform the soldering operation, the mask, even though a very effective reflector, eventually becomes overheated and will be destroyed. This point has been verified many times in experimental work. If the focal zone is enlarged by defocusing to overcome heating of the mask, the heated zone becomes excessively large, and adjacent areas on the printed circuit board will be subjected to potentially dangerous heating. In brief, therefore, some means had to be provided to reflect the central portion of the focal zone away from the flat pack body and to utilize the energy so reflected to perform the desired work, namely, the soldering of the leads to their associated terminals.

A solution to the problem takes the form of a wedge-shaped or triangular-shaped mask, namely the chuck 20, which operates to divide the zone of greatest radiation intensity and to direct the intensity to the two discrete work zones. For example, considering FIGURE 2, energy source 11, when energized, emits rays which are reflected by the reflector member 12 and directed towards a focal point $F_2$, as shown by lines 28 for presenting the focused light rays. These rays impinge upon the surfaces 20b and 20c of the vacuum chuck 20 and are reflected downwardly into the two work zones, namely, the zones in which the flat pack leads 16 and the printed circuit board terminals 15 are located. The surfaces 20b and 20c are highly reflective, preferably being formed of aluminum. This arrangement has been found to be very effective and efficient in operation. In an effort to control the transverse distribution of radiation, the surfaces 20b and 20c may be formed slightly barrel-shaped, as shown in FIGURE 2a, so as to reliably control transverse radiation distribution. This modified design has also been found to be very effective.

Whereas the method detailed above teaches one preferred approach for the coating of the flat pack leads 16 (see FIGURE 1), any other suitable technique may be employed. For example, FIGURE 7 shows a hypodermic-type dispensing device 30 which may be employed to apply the solder cream. The dispensing device 30 is provided with a cylindrical-shaped body portion 31 tapering at 32 to dispense the solder cream. The upper end of the body is provided with a plunger 33 which may be manually depressed at 34 so as to purse its opposite end 35 against the solder cream 18 to dispense it, as shown at 18'. The opening in the dispenser may be of any desired shape depending only upon the manner in which the solder cream is desired to be applied to the joint to be soldered.

Still another method which may be employed to dispense solder is that of rolling a stripe of the solder paste upon the work surface to be soldered. This may be carried out by using a small roller, applying the solder paste around one narrow circular band of the roller and rolling the solder paste upon the surface to be soldered. This approach may be employed in printed circuit boards of the type shown in FIGURES 5a–5d. Considering FIGURE 5a, for example, there is shown therein one portion of a printed circuit board 40 which has a plurality of terminals 41 to be soldered to associated leads of a second device. In order to perform the soldering operation, a stripe 42 of solder cream is applied transversely to the width of each of the terminals 41 in the manner shown in FIGURE 5b. As can clearly be seen, the stripe 42 is continuous across the width of the board 40. After application of the solder stripe, the associated leads 43 to be soldered to the terminals 41 are positioned directly upon the terminals, as shown in FIGURE 5c, so that the solder cream stripe 42 is sandwiched between terminals 41 and leads 43. All of the individual solder joints to be formed in the arrangement of FIGURE 5c may be formed simultaneously through the use of an elongated energy source 44, shown in FIGURE 6, which may, for example, be a filament heater having its radiation focused in the area of the elongated dotted rectangle 46, shown in FIGURE 5c, by means of the elongated reflector 45.

During the heating phase, the portions of the solder cream stripe 42 which are not covered by leads 43 are heated more rapidly than the portions of the solder stripe beneath leads 43. These portions tend to sever in the manner shown in FIGURE 5d so that the molten solder "wicks" between the associated leads and terminals 43 and 41, respectively, moving in the opposing directions shown by arrows 47 of FIGURE 5d, so as to provide an excellent solder joint between each of the terminals 41 and their associated leads 43, while at the same time completely severing any electrical path between any two neighboring solder joints. The wicking occurs automatically during the heating process until the solder completely moves beneath terminals 43, as shown at 48. This method briefly simplifies applications wherein a large number of leads and terminals must be soldered to one another by avoiding the need for laying down small dots of solder cream upon each of the terminals to be soldered. Thus, by laying down one single continuous stripe 42 of solder, the solder depositing phase of the soldering operation is greatly simplified, and, due to the phenomenon of wicking, there is no danger whatsoever of an electrical path existing between adjacent terminals of the multiple soldering joints.

It is to be understood that techniques other than rolling can be utilized to apply the stripe 42 in FIGURE 5b. For example, an appropriately cut out stencil has been found to be an effective and simple manner of applying the stripe of solder paste.

As noted previously, the instant invention lends itself to an application wherein the individual leads of a circuit component may be properly treated in the factory such that many ultimate users can employ such treated devices within circuits peculiar to their own needs. Thus the instant invention contemplates that the leads 16 of the flat pack device 17 of FIGURE 1 be dipped in the solder cream 18; placed on the chuck 20, which is then rotated; with the chuck and device 17 then being positioned under the infrared source 11 for solder hardening, in the exact same manner as was described with respect to FIGURE 2.

It will be appreciated that these steps differ from the steps previously described in that no printed circuit board (such as comprising the substrate 14 with the terminals 15) is positioned beneath the outstanding terminals 16 of the flat pack 17. Thus after the proper timing cycle, the solder paste on the terminals 16 hardens, and the device can be shipped as an individual pretreated component which the ultimate user may employ in the following manner.

Assuming that an ultimate user wishes to place the pretreated component 17 (pretreated in the sense that the terminals 16 have already been covered with the solder paste) into a particular circuit, he merely has to heat the terminals 16, thereby changing the hardened solder paste back to its molten state; place the terminals 16 over the appropriate terminals of his circuit; and then appropriately position the assembly thus formed under an infrared source such as that illustrated in FIGURE 2. After the appropriate timing cycle the solder joints are completed in exactly the same manner as if the entire operation took place at the factory where the flat pack 17 was originally treated.

Such a process inherently broadens the application of the instant invention since it allows the ultimate user to connect the pretreated components into any particular circuit which he desires, rather than requiring the initial manufacturer to turn out completed circuits which may or may not satisfy the requirements of all users.

It is to be understood that the above described process can be employed to pretreat the terminals or leads (broadly designated members) of printed circuit boards or any other element in exactly the same manner as was described for the leads 16 or the device 17.

It can be seen from the foregoing that the instant invention provides a novel method and apparatus for soldering leads to associated terminals of a printed circuit board wherein extremely high reliability of the solder joints is achieved, uniformity of the soldering operation is maintained and charring of the printed circuit board is completely avoided.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What I claim is:

1. Apparatus for use in soldering leads of a first device to associated terminals on a printed circuit board and having solder between the engaging surfaces of the associated leads and terminals comprising:
   a pedestal for supporting the printed circuit board;
   a source of radiant energy positioned above said pedestal;
   reflector means at least partially surrounding said energy source for focusing radiation emanating from said source within a region located in close proximity to the surface of said printed circuit board;
   a pivotally mounted chuck for holding said device;
   said chuck being movable to position said device upon said printed circuit board so that said leads are in alignment with associated terminals on said board;
   said chuck having at least one inclined reflective surface for focusing radiation impinging on said surface upon the region of the connections to be soldered.

2. The apparatus of claim 1, wherein said chuck includes vacuum means for holding the body of said device in position during the soldering operation.

3. The apparatus of claim 1, further comprising:
   a power supply for said energy source;
   manually operable timing means coupled to said power supply for controlling the duration of energization of said energy source.

4. The apparatus of claim 3, wherein said timing means is adjustable to vary the duration of energization of the energy source.

5. The apparatus of claim 1, wherein said energy source is located at a first focal point;
   said reflector means being designed to re-image the energy emitted from said energy source at a second focal point located substantially in the immediate region of the connections to be soldered.

6. The apparatus of claim 1, wherein the device to be soldered to said printed circuit board has a substantially flat rectangular-shaped body with leads projecting from opposing sides of said body;
   said chuck having an undersurface for mounting said body so that the leads project beyond the opposing edges of said chuck;
   said chuck having a pair of inclined reflective surfaces tapering upwardly from said undersurface for focusing radiation impinging upon said surfaces onto the region of the connections to be soldered.

7. The apparatus of claim 6, wherein said inclined surfaces are barrel-shaped to control transverse distribution of the radiation.

8. The apparatus of claim 1, wherein said chuck means is a wedge-shaped member having a first surface for mounting the device and second and third inclined reflective surfaces from reflecting radiation impinging upon said second and third surfaces to the region of the connections being soldered.

9. The apparatus of claim 8, wherein said first surface has a depression for seating the body of the device to be soldered.

10. The apparatus of claim 8, wherein said first surface has a depression for seating the body of the device to be soldered;
    vacuum means for holding the body of said device in position against the chuck means.

11. Apparatus for use in pretreating a member for a subsequent soldering operation, comprising:
 a source of radiant energy;
 reflector means at least partially surrounding said energy source for focusing radiation emanating from said source within a preselected region; and
 a focusing means positioned between said source and said member and adjacent said member with respect to said preselected region, said focusing means having at least one reflective surface for focusing radiation impinging thereon upon a portion of said member which will be involved in a subsequent soldering operation and for preventing radiation from striking a predetermined second portion of the member underlying the focusing means.

12. The apparatus of claim 11, wherein said focusing means is a pivotally mounted chuck for holding said member, said chuck being movable to position said member with respect to said preselected region.

References Cited
UNITED STATES PATENTS

| | | |
|---|---|---|
| 2,095,502 | 10/1937 | Johnston. |
| 2,354,658 | 8/1944 | Barber _____ 219—349 |
| 2,861,166 | 11/1958 | Cargill _____ 219—85 |

JOSEPH V. TRUHE, Primary Examiner

BARRY A. STEIN, Assistant Examiner

U.S. Cl. X.R.

219—349